Figure 1:
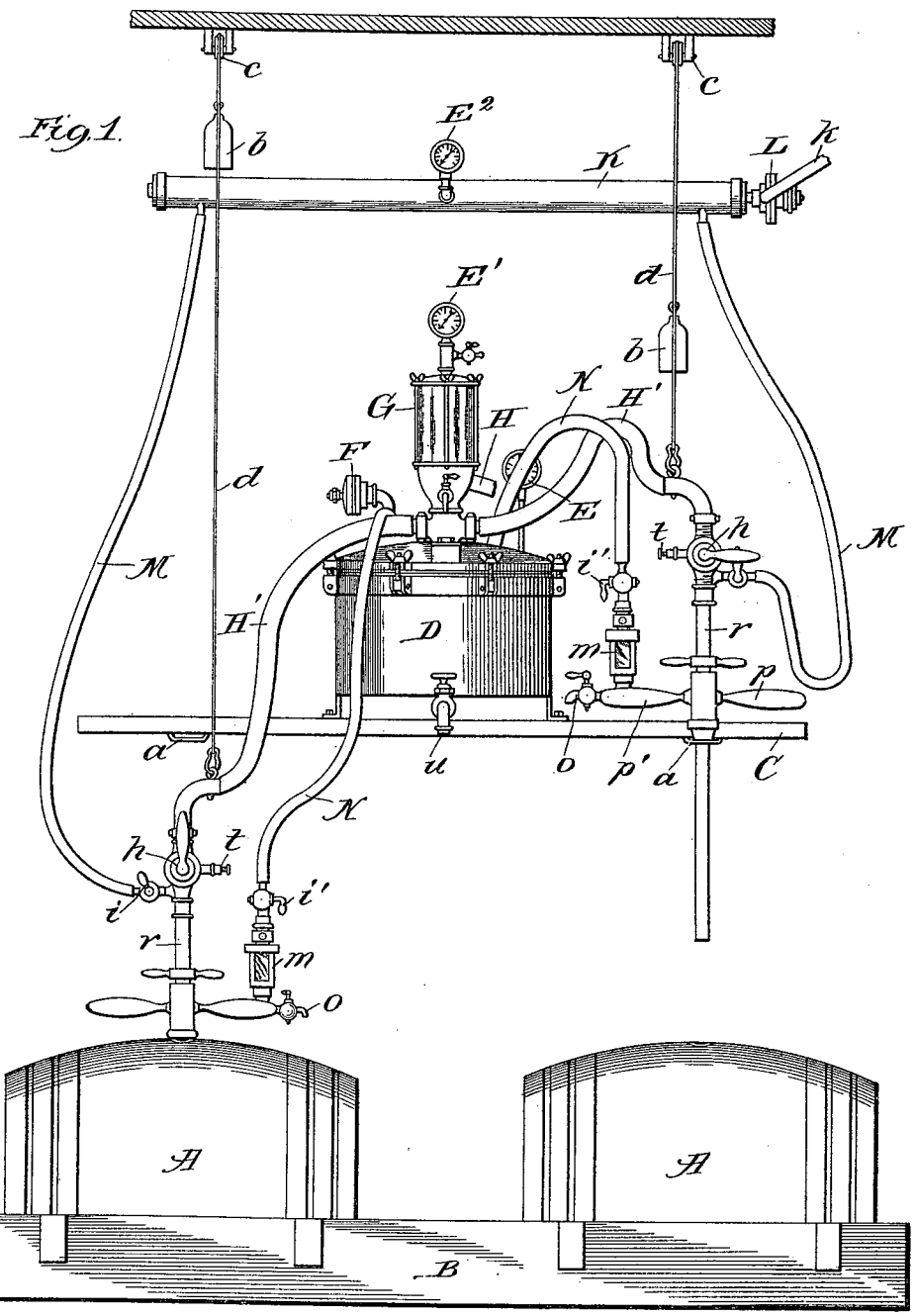

No. 623,758. Patented Apr. 25, 1899.
O. ZWIETUSCH.
APPARATUS FOR RACKING BEER.
(Application filed Jan. 23, 1897.)
(No Model.) 3 Sheets—Sheet 1.

Witnesses:
Inventor
Otto Zwietusch,
By Dyrenforth & Dyrenforth,
Attys.

No. 623,758. Patented Apr. 25, 1899.
O. ZWIETUSCH.
APPARATUS FOR RACKING BEER.
(Application filed Jan. 23, 1897.)
(No Model.) 3 Sheets—Sheet 2.

Witnesses:
Chas. E. Gaylord.
Luth. P. Filtz.

Inventor:
Otto Zwietusch,
By Dyrenforth & Dyrenforth,
Attys.

No. 623,758. Patented Apr. 25, 1899.
O. ZWIETUSCH.
APPARATUS FOR RACKING BEER.
(Application filed Jan. 23, 1897.)
(No Model.) 3 Sheets—Sheet 3.
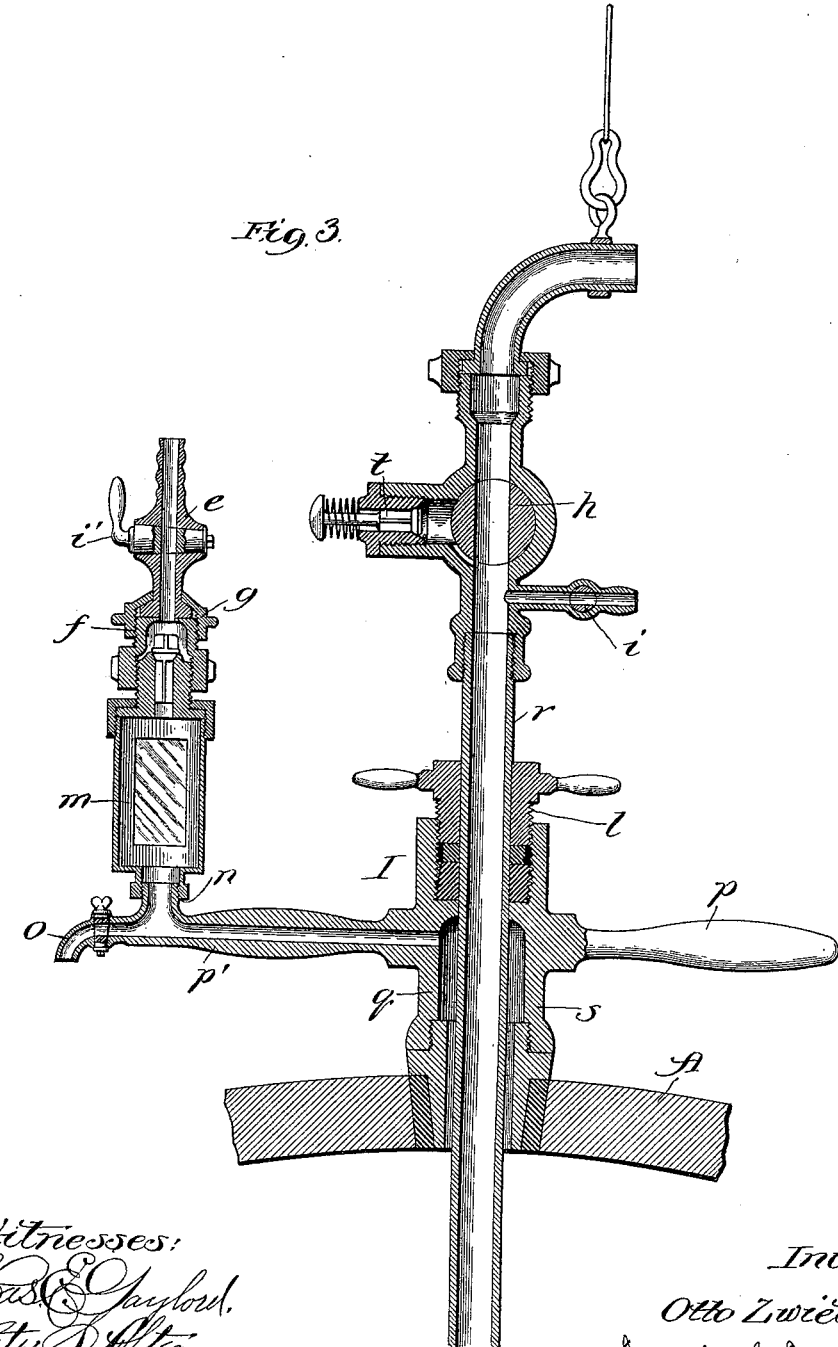
Witnesses:
Inventor,
Otto Zwietusch,
By Dyrenforth & Dyrenforth,
Attys.
THE NORRIS PETERS CO., PHOTO-LITHO., WASHINGTON, D. C.

UNITED STATES PATENT OFFICE.

OTTO ZWIETUSCH, OF MILWAUKEE, WISCONSIN.

APPARATUS FOR RACKING BEER.

SPECIFICATION forming part of Letters Patent No. 623,758, dated April 25, 1899.

Application filed January 23, 1897. Serial No. 620,486. (No model.)

*To all whom it may concern:*

Be it known that I, OTTO ZWIETUSCH, a citizen of the United States, residing at Milwaukee, in the county of Milwaukee and State of Wisconsin, have invented a new and useful Improvement in Apparatus for Racking Beer, of which the following is a specification.

My invention relates to an improved apparatus for racking finished beer into shipping-casks under an aeriform counter-pressure, which may be produced by atmospheric air, though I prefer to use carbonic-acid gas, so that the beer shall not come into contact with atmospheric air during the filling operation.
By employing either atmospheric air or carbonic-acid gas as the counter-pressure agent all foaming of the beer and all loss of gas and beer are prevented by means of my improved apparatus; but by the use of carbonic-acid gas for the counter-pressure additional advantages are obtained which cannot be obtained by the use of atmospheric air.

My present invention is in the nature of an improvement upon the filling device described and shown in my Patent No. 398,109, granted February 19, 1889. In the device there described a vessel surmounted by a pressure-gage, pressure-relief valve, and pressure-reducing valve communicates with the air-reservoir by way of a pipe connected to the pressure-reducing valve, and also communicates by means of separate valved pipes provided with glass sections with the annular spaces of filling-bungs of substantially the construction employed in connection with my present improvement. In the use of that device air from the vessel is admitted into the cask to be filled and the beer turned on. As the beer enters the cask it displaces the air therein and causes it to flow back into the vessel. When beer appears in the glass section, the beer-supply is shut off and the valve in the air-pipe is closed. Then an air-vent in the filling-tube is opened and the filling-bung removed, when beer in the filling-tube enters the cask and the latter is bunged. The filling devices are in duplicate, so that the operation may be practically continuous. This device, while highly effective, is not perfect, principally because the same pipe which conveys air from the air vessel to the shipping-cask serves to return the air, mingled with gas and foam, from the shipping-cask to the air vessel. Hence when air is supplied to a fresh empty cask it carries with it more or less beer and foam which have been lodged in the connecting-pipe, and the effect of this is to excite foaming in the shipping-cask, so that the latter cannot be completely filled. I overcome this difficulty completely by means of my present improvement and am enabled by it to avoid all foaming as well as all waste of beer and to fill the shipping-casks completely.

My invention will be most clearly understood from a description of the accompanying drawings, in which—

Figure 2:
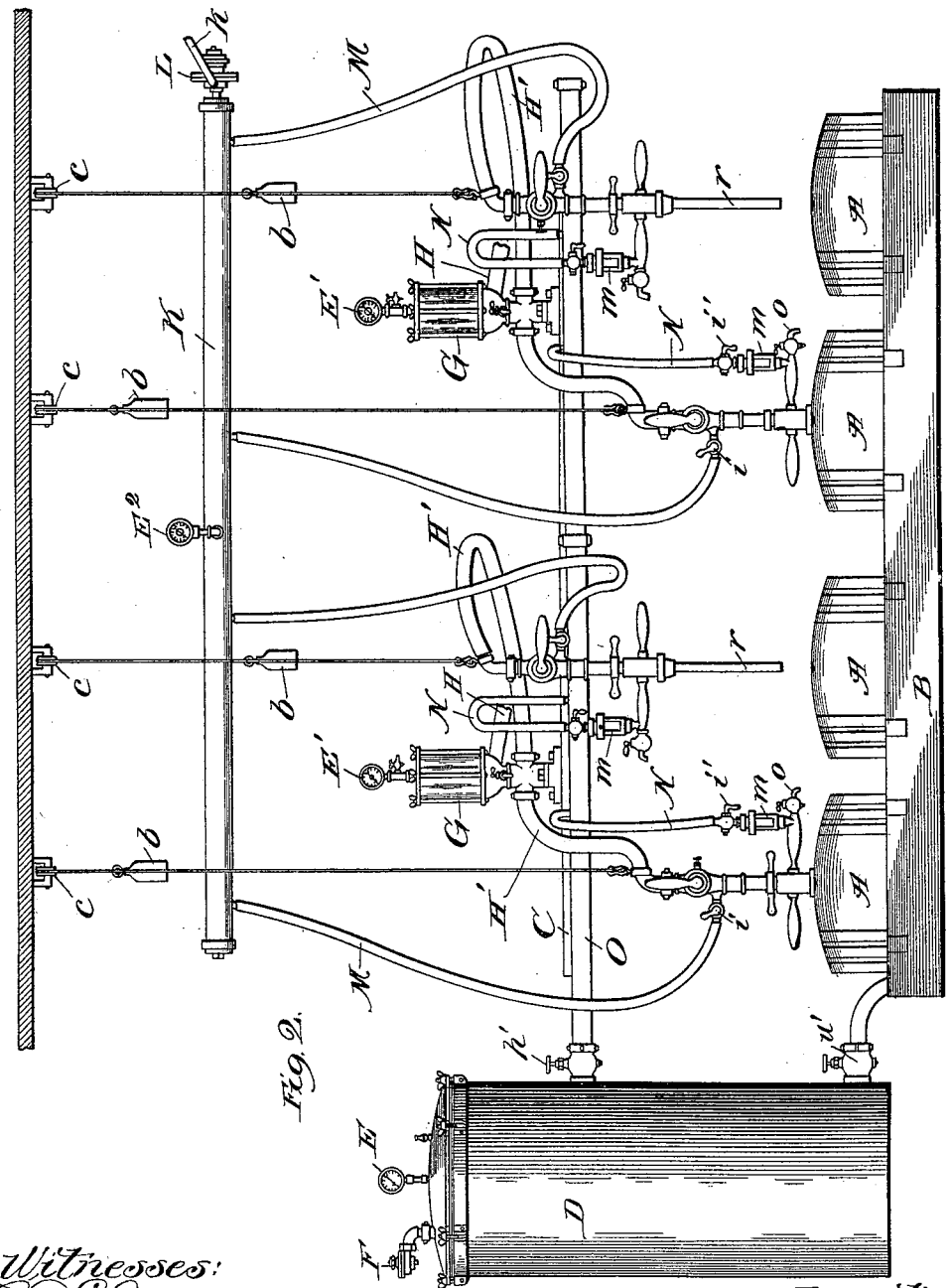

Figure 1 is a front view of my improved apparatus in its simplest form as applied to the filling of one set of alternate casks; Fig. 2, a similar view showing a modification by which the apparatus is adapted for filling two sets of alternate casks; and Fig. 3, an enlarged sectional view of a portion of the shipping-cask, together with the filling-bung and its attachments.

In Fig. 1, A A are the shipping-casks, resting, as usual, in a drip-pan B. C is a table such as is commonly used in connection with filling devices and which may be supported from the wall or ceiling in any desired way. Mounted upon this table is an air-reservoir D, provided with a pressure-gage E and a pressure-relief valve F at its top and with a discharge-cock $u$ at its base. Superimposed on the air-reservoir D is the usual foam-indicator G, having the usual pressure-gage E' and vent and discharge cocks through which the beer on its way from the storage-cask or filter passes on its way to the shipping-casks. The beer enters the foam-indicator by way of the pipe H and passes out by way of the pipe H', leading to the filling-tube of the filling-bung, which is provided with a vent $t$.

The filling-bung I consists of a shell $s$, tapered at its lower end and provided with a rubber gasket to enter the bushing of the cask, a filling-tube $r$, extending vertically through the shell, which latter for a considerable portion of its height has an internal diameter greater than the external diameter of the filling-tube, thereby producing the annular recess $q$, and handles $p$ and $p'$ upon the shell, the handle $p'$ being made tubular and communicating with the annular recess $q$ and having upon its outer end a vent-cock $o$ and adjacent thereto a threaded nipple $n$, to which a glass section $m$ is connected. The filling-tube is secured within the shell by means of a gland $l$ in the usual way.

Supported in any desired way, preferably above the foam-indicator, is a reservoir K, provided with a pressure-gage $E^2$ and with a pressure-reducing valve L, into which a pipe $k$ leads from a suitable holder for carbonic-acid gas or air under high pressure. Leading from the reservoir to the valved extension $i$ on the filling-tube $r$, below the valve $h$ in the latter, which regulates the supply of beer, is a hose M, through which carbonic-acid gas or air is conveyed into the shipping-cask.

Surmounting the glass section $m$ is a casing $g$, containing a check-valve $f$, and leading from the top of this casing is a pipe $e$, provided with a valve $i'$. A hose N leads from the pipe $e$ to the interior of the reservoir D. The filling-bungs and their various attachments are all in duplicate, as shown, in order that shipping-casks may be filled alternately, but of course these parts might be single, if desired. Cords $d$, passing over pulleys $c$ and provided with weights $b$, are secured to the beer-hose H' to aid in raising the filling-bung, and while out of use the latter may be hung upon the hooks $a$.

In describing the working of my apparatus I shall refer to carbonic-acid gas as the counter-pressure medium.

The operation is as follows: When a cask is to be filled, the filling-bung is inserted and the valve $i$ is opened, admitting carbonic-acid gas from the reservoir K to the bottom of the cask by way of the filling-tube $r$. The valve $i$ need be left open only for a very brief period, since the pressure in the reservoir K, which should be about three pounds, is almost immediately communicated to the cask. The air within the cask being lighter than carbonic-acid gas forms a stratum above the latter, and when beer is admitted the air is driven off first. Upon closing the valve $i$ the valve $h$ in the filling-tube, and also the valve $i'$ in the pipe $e$, to which the hose N is connected, are opened, whereupon beer at the normal filling-pressure (usually seven pounds, more or less) enters the shipping-cask. This causes the air, and thereafter the free carbonic-acid gas, in the cask to escape by way of the hose N into the reservoir D, which is regulated for about four pounds pressure, and as soon as beer is observed in the glass section $m$ the valve $h$ is closed, cutting off the beer-supply, and the cock $o$ is opened, thus draining the glass section. The opening of the cock $o$ operates to close the check-valve $f$, and thus prevents any return of air and gas from the reservoir D, and it also relieves the overpressure in the filling-bung. Hence this cock $o$ is of very great importance, and it must always be opened promptly when any sign of beer is observed in the glass section $m$. Neglect to do this before removing the filling-bung will cause foaming in the shipping-cask, and if this occurs the cask must be emptied and refilled. Under ordinary circumstances the valve $i'$ may be left open during the operation of filling consecutive casks, since the check-valve $f$ will answer every requirement. At times, however, the check-valve may become clogged and fail to operate satisfactorily, in which case the valve $i'$ should be employed—that is to say, opened when the beer is let on and closed when the beer-supply is shut off, and the cock $o$ opened. After opening the cock $o$ the filling-bung is withdrawn by means of the handles $p$ and $p'$, and as the filling-tube leaves the shipping-cask the vent $t$ is opened by pressing the knob, which permits air to enter above the beer in the tube, and thus cause the beer to descend into the cask, filling the latter. Thereupon the cask is bunged in the usual way.

The apparatus shown in Fig. 2 differs from that shown in Fig. 1 only in matters of detail. The reservoir D instead of being mounted upon the table C is at one side of the apparatus, the foam-indicators G are directly upon the table, and an inclined pipe O, closed at one end, is secured to the table and leads into the reservoir. Communication between the pipe and the reservoir may be cut off, when desired, by means of the valve $h'$. A cock $u'$ at the lower end of the reservoir serves to drain the latter into the drip-pan B' or into any other receptacle. In this form of device the hose connections N lead into a common conduit O instead of directly into the reservoir D. Aside from these features and the multiplication of parts the apparatus shown in Fig. 2 is like that shown in Fig. 1. It is obvious that by extending the reservoir K and the conduit O the number of filling devices may be still further increased.

I have found it advantageous in practice to exclude the beer as far as possible from all contact with atmospheric air during the operation of filling, and it is for this reason that I prefer to employ carbonic-acid gas to effect the counter-pressure in the shipping-cask. Obviously when carbonic-acid gas is used the air is forced out through the channel provided for that purpose without contact with the beer, but only with carbonic-acid gas, by reason of the action heretofore described.

It will be seen that by the use of my apparatus described above no waste of beer is possible. The overflow is so insignificant that I have found the drip-pan B to be an unnecessary adjunct, so that it may be dispensed with, if desired.

In filling beer with a counter-pressure filling apparatus, where the shipping-casks, especially when of large size, are filled with pressure from a vessel which collects beer and foam and is not furnished with an additional pressure-supply the counter-pressure in the vessel is diminished to a considerable extent and a certain time is required to regain the standard blow-off pressure. Such a variation acts upon the filter and causes a corresponding variation of pressure during the process of filtration, which, as is well known, results in interrupted filtration with unsatisfactory results. No such difficulty is possible with my improved apparatus above described. Moreover, where carbonic-acid gas is used as the counter-pressure in the shipping-cask and is conducted into the upper part of the cask through the bung-hole the carbonic-acid gas remains in considerable quantity in the upper part of the cask and is driven off first as the beer enters. By means of my apparatus carbonic-acid gas, when this is the aeriform fluid used for the counter-pressure, is admitted into the filling-tube above the bung and below the beer-supply cock, so that the gas passes through the tube, enters the lower part of the empty cask, and forces the air into the upper part of the cask, as before stated. Accordingly when the beer enters the cask the air in the upper part is driven off first and a stratum of carbonic-acid gas is maintained upon the surface of the beer, whereby all accumulation of gas from the beer and all contact of the beer with air are avoided.

The inspection-glass for determining when the cask is full is of small capacity and is placed directly upon the filling-bung near the surface of the beer, so that there is very little waste to be disposed of and such as there is passes to the reservoir and not into a fresh empty cask.

What I claim as new, and desire to secure by Letters Patent, is—

1. The combination of a receptacle, having means for sealing it and having a controllable vent in its upper part, a valved conduit communicating with a source of carbonic-acid gas under pressure and leading to the lower part of the receptacle, and a valved conduit communicating with a reservoir for holding a gaseous liquid under pressure and also leading to the lower part of the receptacle, whereby, when carbonic-acid gas is admitted to the receptacle, with the vent open, and the liquid is thereafter admitted, the carbonic-acid gas is forced upward and out of the receptacle, driving before it the atmospheric air, substantially as described.

2. The combination of a receptacle, having means for sealing it and having an outlet-conduit in its upper part provided with a controllable vent to the open air and a valve above the vent, a counter-pressure-receiving vessel into which the outlet-conduit leads, a valved conduit communicating with a source of carbonic-acid gas under pressure and leading to the lower part of the receptacle, and a valved conduit communicating with a reservoir for holding a gaseous liquid under pressure and also leading to the lower part of the receptacle, whereby, when carbonic-acid gas is admitted to the receptacle, and the liquid thereafter admitted, the carbonic-acid gas is forced upward and out of the receptacle into the counter-pressure-receiving vessel, and whereby, when the receptacle is full, the air, gas and foam may be diverted to the open air preparatory to sealing the receptacle, substantially as described.

3. In an apparatus for racking beer into casks, the combination with the filling-bung comprising the usual shell and filling-tube having a passage between them for displaced air, gas and foam, and a vent-valve for the filling-tube, of a reservoir for an aeriform fluid under pressure, a valved conduit leading therefrom to the filling-tube, a separate counter-pressure reservoir for receiving air, gas and foam displaced from the cask, a conduit connecting the last-named reservoir with the passage for air, gas and foam in the filling-bung, a glass section in the last-named conduit, a valve in said conduit above the glass section, and a vent-valve in said conduit below the glass section, substantially as described.

4. In an apparatus for filling beer, the combination with a hose leading from the beer-supply, of the filling-bung I, having as parts thereof the shell $s$ and filling-tube $r$ provided with a valve $h$, said shell $s$ at its lower portion being of greater internal diameter than the external diameter of the filling-tube whereby a recess $q$ is formed between them and having an outlet branch leading from said recess provided with a cock $o$ and inspection-glass $m$, a reservoir K provided with a pressure-gage and pressure-reducing valve, a pipe for conveying an aeriform fluid under pressure into said pressure-reducing valve, a valved conduit M leading from the reservoir K into the filling-tube $r$ below the valve $h$ thereof, a reservoir D provided with a pressure-gage, pressure-relief valve and drainage-cock, and a valved pipe leading from the inspection-glass $m$ to the reservoir D, substantially as described.

5. In combination with the filling-bung I, comprising the shell $s$, filling-tube $r$ extending vertically through the shell $s$ and providing therewith a recess $q$, handle $p$, tubular handle $p'$ leading from the recess $q$ and provided with the vent-cock $o$ and nipple $n$, gland $l$ serving as a packing between the filling-tube and shell, valve $h$, vent $t$, and outlet branch having the valve $i$ on the filling-tube and a coupling device upon the upper end of the filling-tube for connecting the beer-supply hose, the inspection-glass $m$ mounted upon the nipple $n$, casing $g$ mounted upon the inspection-glass $m$ and containing a check-valve $f$ and the tubular extension $e$ for connecting with a hose for carrying off the overflow, substantially as described.

OTTO ZWIETUSCH.

In presence of—
OSCAR B. ZWIETUSCH,
J. W. DYRENFORTH.